(12) United States Patent
Mariano et al.

(10) Patent No.: US 10,584,590 B2
(45) Date of Patent: Mar. 10, 2020

(54) TOOTHED COMPONENT OPTIMIZATION FOR GAS TURBINE ENGINE

(71) Applicant: United Technologies Corporation, Farmington, CT (US)

(72) Inventors: Thomas A. Mariano, Middlebury, CT (US); Steven D. Porter, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 801 days.

(21) Appl. No.: 15/155,242

(22) Filed: May 16, 2016

(65) Prior Publication Data

US 2017/0328204 A1 Nov. 16, 2017

(51) Int. Cl.
*B25G 3/28* (2006.01)
*F01D 5/02* (2006.01)
(Continued)

(52) U.S. Cl.
CPC .............. *F01D 5/025* (2013.01); *F01D 5/02* (2013.01); *F01D 5/026* (2013.01); *F01D 5/06* (2013.01);
(Continued)

(58) Field of Classification Search
CPC .......... F01D 5/066; F01D 5/025; F01D 5/026; F01D 5/06; F01D 9/02; F02C 3/01; F02C 3/04; Y10T 403/7035
See application file for complete search history.

(56) References Cited

U.S. PATENT DOCUMENTS

| 2,427,641 | A | * | 9/1947 | Wildhaber | B23F 15/06 409/51 |
| 3,356,339 | A | * | 12/1967 | Thomas | F01D 5/06 416/198 A |

(Continued)

FOREIGN PATENT DOCUMENTS

| EP | 0503964 A1 | 9/1992 |
| EP | 1672172 A1 | 6/2006 |

OTHER PUBLICATIONS

European Search Report, European Application No. 17171142.7, dated Oct. 20, 2017, European Patent Office; European Search Report 9 pages.

*Primary Examiner* — Matthew R McMahon
(74) *Attorney, Agent, or Firm* — Cantor Colburn LLP

(57) ABSTRACT

Methods of manufacturing toothed components for gas turbine engines are provided. The methods include forming a first tooth in the component with a top land, a bottom land, a side wall extending therebetween, and a fillet radius transitioning between the side wall and the bottom land, forming a second tooth in the component adjacent the first tooth, the second tooth having a top land, a bottom land, a side wall extending therebetween and facing the first tooth, and a fillet radius transitioning between the side wall and the bottom land, the bottom land of the second tooth extending toward the bottom land of the first tooth, wherein the bottom lands define a gable area of the component, and forming a stress relief feature in the gable area such that the stress relief feature reduces a stress concentration near the gable area during operation of the toothed component.

8 Claims, 7 Drawing Sheets

(51) Int. Cl.
  *F01D 5/06* (2006.01)
  *F01D 5/14* (2006.01)
  *F01D 9/02* (2006.01)
  *F02C 3/04* (2006.01)
  *F02C 7/18* (2006.01)

(52) U.S. Cl.
  CPC ............... *F01D 5/066* (2013.01); *F01D 5/14* (2013.01); *F01D 9/02* (2013.01); *F02C 3/04* (2013.01); *F02C 7/18* (2013.01); *F05D 2220/32* (2013.01); *F05D 2230/10* (2013.01); *F05D 2260/50* (2013.01); *Y10T 403/7035* (2015.01)

(56) References Cited

U.S. PATENT DOCUMENTS

| | | | | |
|---|---|---|---|---|
| 4,060,007 A * | 11/1977 | Levesque | ................ | B23F 15/06 192/108 |
| 4,573,875 A * | 3/1986 | Emeterio | ................ | F01D 5/025 403/355 |
| 5,536,144 A * | 7/1996 | Bednarz | ................ | F01D 5/025 416/198 A |
| 5,735,180 A * | 4/1998 | McMurtry | ............ | B23Q 16/08 74/813 L |
| 6,164,880 A * | 12/2000 | Pulley | ................... | B23F 17/005 409/1 |
| 6,572,337 B1 * | 6/2003 | Herron | .................... | F01D 5/026 416/198 A |
| 6,672,966 B2 * | 1/2004 | Muju | ...................... | F16D 1/112 415/124.2 |
| 7,572,117 B2 * | 8/2009 | Hosono | ................... | F04C 2/084 403/359.6 |
| 8,465,373 B2 * | 6/2013 | Dornfeld | ................ | F16D 1/076 403/359.2 |
| 9,103,212 B2 * | 8/2015 | Le Brusq | ................ | F01D 5/025 |
| 9,212,557 B2 * | 12/2015 | Benjamin | ............. | F01D 5/066 |
| 9,518,612 B2 * | 12/2016 | Brathwaite | ............. | B23F 15/06 |
| 9,598,981 B2 * | 3/2017 | Salunkhe | ............. | F01D 25/30 |
| 2007/0071545 A1 | 3/2007 | Schenk | | |

* cited by examiner

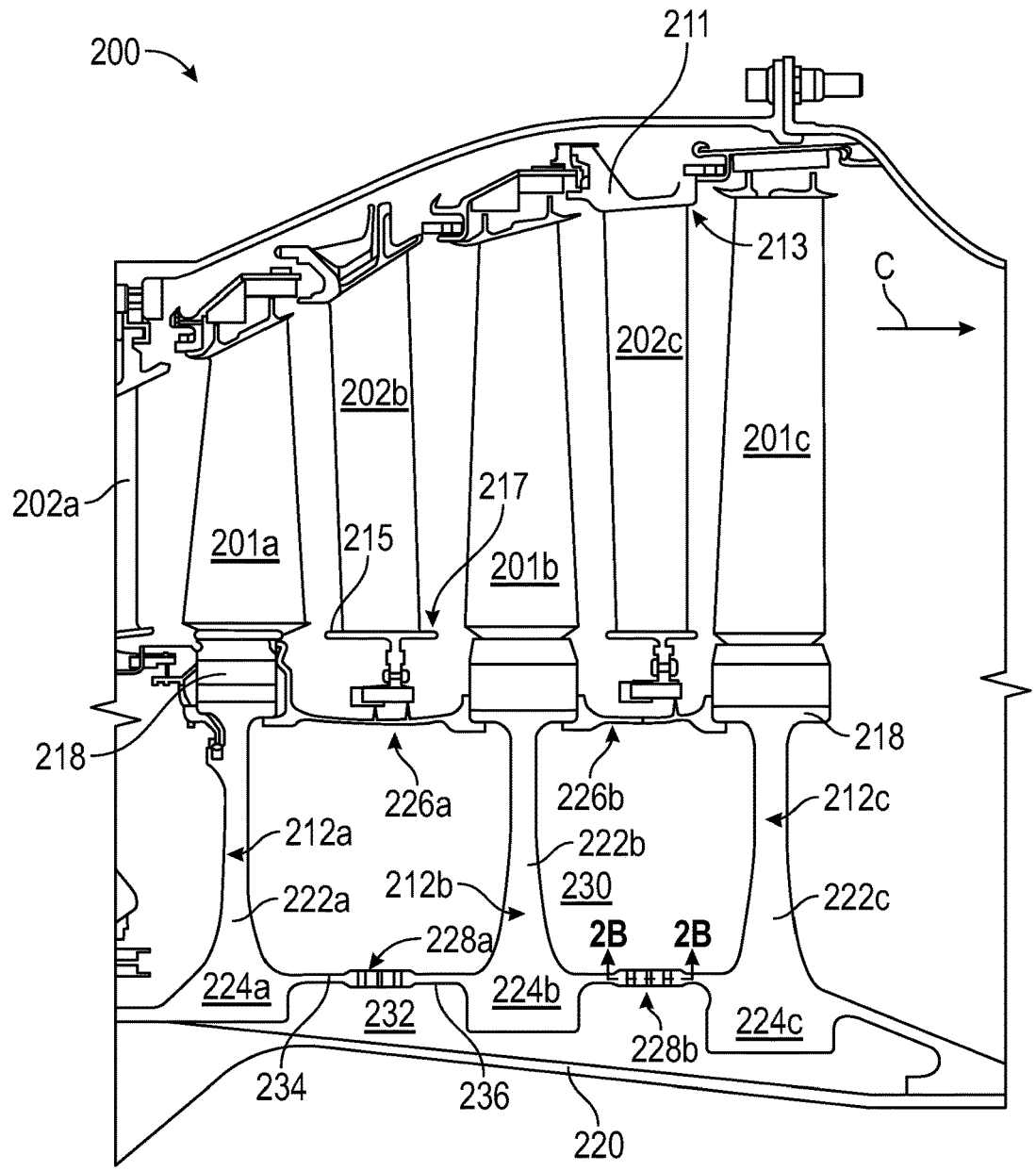
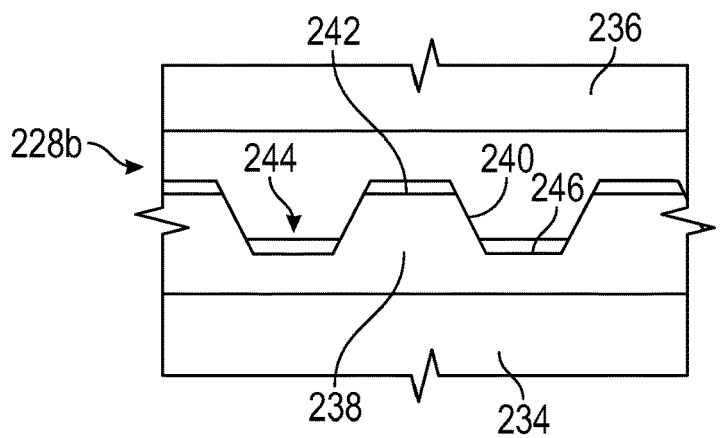
FIG. 2A
FIG. 2B

TOOTHED COMPONENT OPTIMIZATION FOR GAS TURBINE ENGINE

BACKGROUND

The subject matter disclosed herein generally relates to gas turbine engines and, more particularly, to optimized toothed components for gas turbine engines.

Gas turbine engines include a plurality of elements, each subject to various stresses, loads, etc. Due to the operational conditions within the engines, certain components and/or parts may have shorter operational life spans than other components or parts. For example, toothed components, such as curvic couplings, may be subject to various stresses and stress concentrations that can impact the component life. Accordingly, it may be advantageous to provide improved life components for gas turbine engines.

SUMMARY

According to one embodiment, a method of manufacturing a toothed component for a gas turbine engine is provided. The method includes forming a first tooth in the component, the first tooth having a top land, a bottom land, a side wall extending from the top land to the bottom land, and a fillet radius transitioning between the side wall and the bottom land, forming a second tooth in the component adjacent the first tooth, the second tooth having a top land, a bottom land, a side wall extending from the top land to the bottom land and facing the first tooth, and a fillet radius transitioning between the side wall and the bottom land, the bottom land of the second tooth extending toward the bottom land of the first tooth, wherein the bottom lands of the first tooth and the second tooth define a gable area of the component, and forming a stress relief feature in the gable area such that the stress relief feature reduces a stress concentration near the gable area during operation of the toothed component.

In addition to one or more of the features described above, or as an alternative, further embodiments of the method may include that the first tooth, the second tooth, and the stress relief feature are formed simultaneously.

In addition to one or more of the features described above, or as an alternative, further embodiments of the method may include that forming the stress relief feature comprises removing material of the component in the gable area.

In addition to one or more of the features described above, or as an alternative, further embodiments of the method may include that the stress relief feature defines a planar surface.

In addition to one or more of the features described above, or as an alternative, further embodiments of the method may include that the stress relief feature is a full radius extending from the side wall of the first tooth to the side wall of the second tooth.

In addition to one or more of the features described above, or as an alternative, further embodiments of the method may include that forming the stress relief feature comprises forming a first stress relief notch at a first side of the gable area and forming a second stress relief notch at a second side of the gable area.

In addition to one or more of the features described above, or as an alternative, further embodiments of the method may include that the location of the first stress relief notch is located in the fillet radius of the first tooth, and the location of the second stress relief notch is located in the fillet radius of the second tooth.

In addition to one or more of the features described above, or as an alternative, further embodiments of the method may include that the toothed component is a curvic of a gas turbine engine.

In addition to one or more of the features described above, or as an alternative, further embodiments of the method may include that the curvic comprises a plurality of teeth with a plurality of stress relief features located between adjacent teeth of the plurality of teeth.

According to another embodiment, a toothed component for a gas turbine engine is provided. The toothed component includes a structure configured to engage with another component of the gas turbine engine, a first tooth on the structure, the first tooth having a top land, a bottom land, a side wall extending from the top land to the bottom land, and a fillet radius transitioning between the side wall and the bottom land, a second tooth on the structure adjacent the first tooth, the second tooth having a top land, a bottom land, a side wall extending from the top land to the bottom land and facing the first tooth, and a fillet radius transitioning between the side wall, the bottom land of the second tooth extending toward the bottom land of the first tooth, wherein the bottom lands of the first tooth and the second tooth define a gable area of the component, and at least one stress relief feature formed in the gable area defining a reduced stress concentration near the gable area during operation of the toothed component.

In addition to one or more of the features described above, or as an alternative, further embodiments of the toothed component may include that the stress relief feature defines a planar surface.

In addition to one or more of the features described above, or as an alternative, further embodiments of the toothed component may include that the stress relief feature defines a full radius extending from the side wall of the first tooth to the side wall of the second tooth.

In addition to one or more of the features described above, or as an alternative, further embodiments of the toothed component may include that the stress relief feature comprises a first stress relief notch at a first side of the gable area and a second stress relief notch at a second side of the gable area.

In addition to one or more of the features described above, or as an alternative, further embodiments of the toothed component may include that the location of the first stress relief notch is located in the fillet radius of the first tooth, and the location of the second stress relief notch is located in the fillet radius of the second tooth.

In addition to one or more of the features described above, or as an alternative, further embodiments of the toothed component may include that the toothed component is a curvic of a gas turbine engine.

In addition to one or more of the features described above, or as an alternative, further embodiments of the toothed component may include that the curvic comprises a plurality of teeth with a plurality of stress relief features located between adjacent teeth of the plurality of teeth.

According to another embodiment, a gas turbine engine is provided. The gas turbine engine includes a structure defining a curvic of the gas turbine engine, the curvic having a first tooth on the structure, the first tooth having a top land, a bottom land, a side wall extending from the top land to the bottom land, and a fillet radius transitioning between the side wall and the bottom land, a second tooth on the structure adjacent the first tooth, the second tooth having a top land, a bottom land, a side wall extending from the top land to the bottom land and facing the first tooth, and a fillet radius transitioning between the side wall, the bottom land of the second tooth extending toward the bottom land of the first tooth, wherein the bottom lands of the first tooth and the second tooth define a gable area of the component, and at least one stress relief feature formed in the gable area defining a reduced stress concentration near the gable area during operation of the toothed component.

In addition to one or more of the features described above, or as an alternative, further embodiments of the gas turbine engine may include that the stress relief feature defines a planar surface.

In addition to one or more of the features described above, or as an alternative, further embodiments of the gas turbine engine may include that the stress relief feature defines a full radius extending from the side wall of the first tooth to the side wall of the second tooth.

In addition to one or more of the features described above, or as an alternative, further embodiments of the gas turbine engine may include a second structure, the second structure configured to engage with the curvic, the second structure having a second structure stress relief feature.

Technical effects of embodiments of the present disclosure include toothed components of a gas turbine engine having a stress relief feature that enables reduced stress concentration and improved component life. Further technical effects include a gable area between adjacent teeth of the toothed component having material removed therefrom to form the stress relief feature.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 2A is a schematic illustration of a portion of a gas turbine engine illustrating a curvic coupling;

FIG. 2B is an enlarged schematic illustration of the curvic coupling of FIG. 2A viewed along the line 2B-2B;

DETAILED DESCRIPTION

Figure 1A:
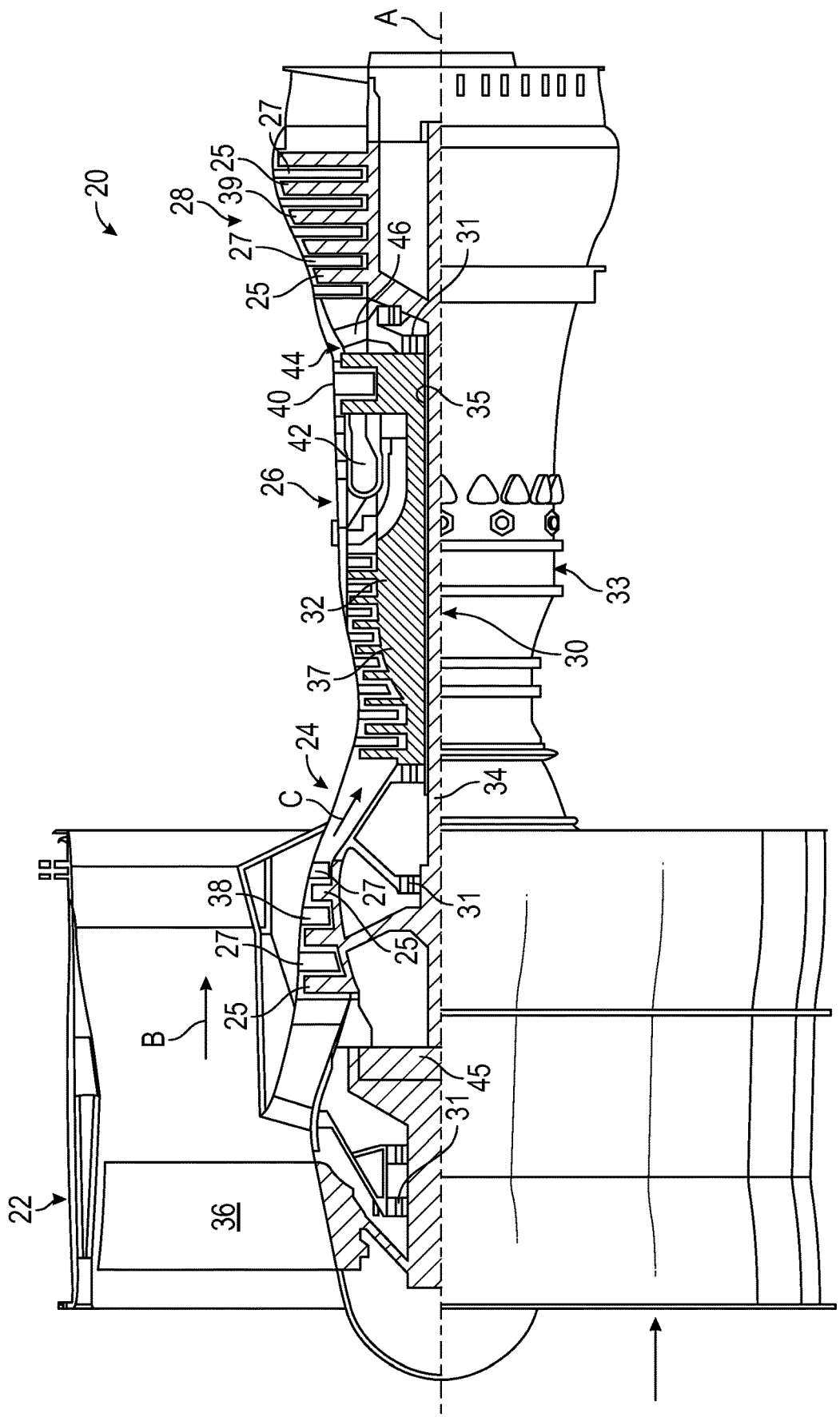
FIG. 1A is a schematic cross-sectional illustration of a gas turbine engine that may employ various embodiments disclosed herein.

As shown and described herein, various features of the disclosure will be presented. Various embodiments may have the same or similar features and thus the same or similar features may be labeled with the same reference numeral, but preceded by a different first number indicating the Figure Number to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1A schematically illustrates a gas turbine engine 20. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(\text{Tram } ° R)/(518.7° R)]^{0.5}$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Figure 1B:
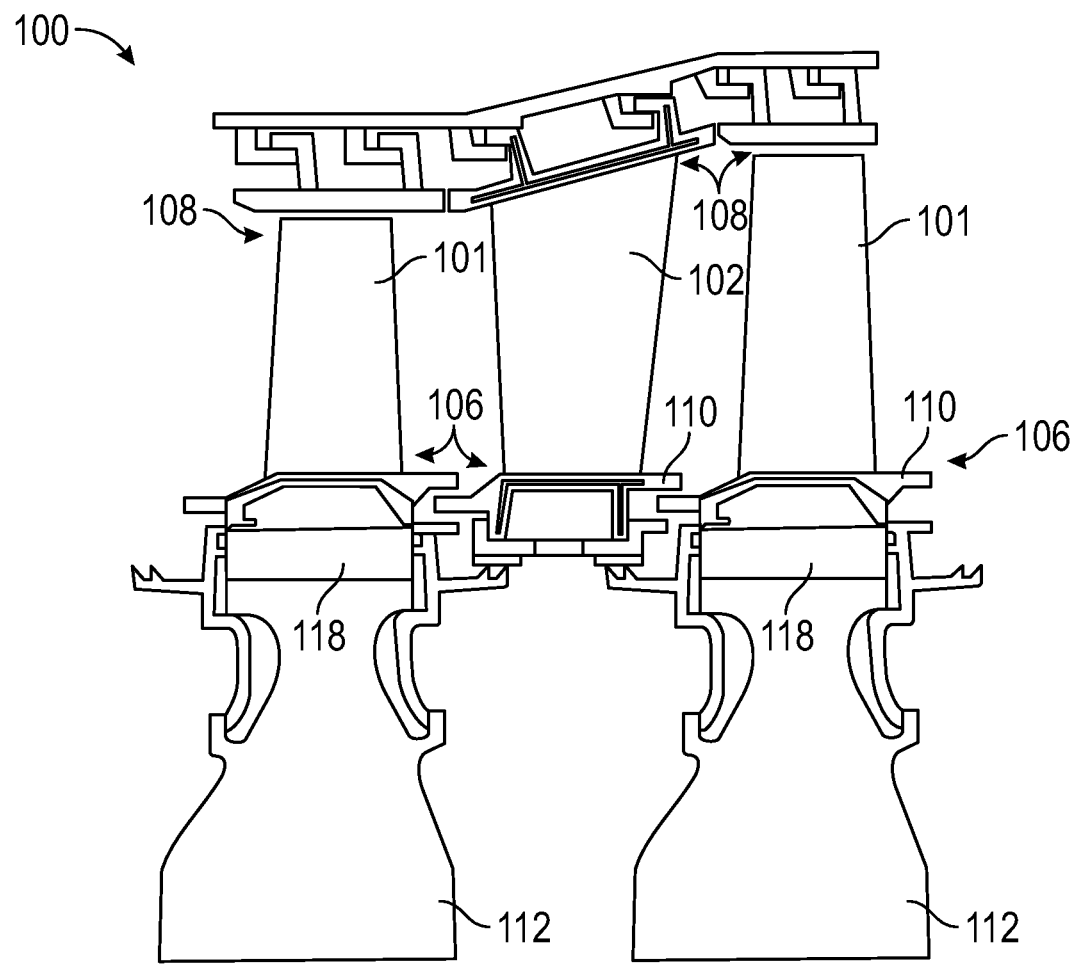
FIG. 1B is a schematic illustration of a turbine that may employ various embodiments disclosed herein.

FIG. 1B is a schematic view of a turbine section that may employ various embodiments disclosed herein. Turbine 100 includes a plurality of airfoils, including, for example, one or more blades 101 and vanes 102. The airfoils 101, 102 may be hollow bodies with internal cavities defining a number of channels or cavities, hereinafter airfoil cavities, formed therein and extending from an inner diameter 106 to an outer diameter 108, or vice-versa. The airfoil cavities may be separated by partitions within the airfoils 101, 102 that may extend either from the inner diameter 106 or the outer diameter 108 of the airfoil 101, 102. The partitions may extend for a portion of the length of the airfoil 101, 102, but may stop or end prior to forming a complete wall within the airfoil 101, 102. Thus, each of the airfoil cavities may be fluidly connected and form a fluid path within the respective airfoil 101, 102. The blades 101 and the vanes may include platforms 110 located proximal to the inner diameter thereof. Located below the platforms 110 may be airflow ports and/or bleed orifices that enable air to bleed from the internal cavities of the airfoils 101, 102. A root of the airfoil may connected to or be part of the platform 110. The platform 110 may be mounted to an attachment 118 of a turbine disk 112.

Turning now to FIGS. 2A-2B, schematic illustrations of a rotor stack mounted to a shaft of a gas turbine engine are shown. FIG. 2A shows a side view schematic illustration of a plurality of disks 212a, 212b, 212c mounted to a shaft 220 of a portion of a gas turbine engine 200. FIG. 2B shows a detailed, radial view of a coupling of the turbine engine 200 as viewed along the line 2B-2B indicated in FIG. 2A.

Each disk 212a, 212b, 212c carries or supports an associated set of blades 201a, 201b, 201c by engagement of respective attachments 218. A plurality of vanes 202a, 202b, 202c are located along a core flow path C sequentially interspersed with the blades 201a, 201b, 201c. The vanes 202a, 202b, 202c comprise airfoils extending radially inward from roots at outboard shrouds/platforms 211 formed as portions of an outer wall 213 of the core flow path C. The airfoils of the vanes 202a, 202b, 202c extend inward to inboard platforms 215 forming portions of an inboard wall 217 of the core flow path C.

In the embodiment of FIG. 2A, each of the disks 212a, 212b, 212c has a respective generally annular web 222a, 222b, 222c extending radially outward from a bore 224a, 224b, 224c to the roots 218. The bores 224a, 224b, 224c encircle central apertures of the disks 212a, 212b, 212c through which the shaft 220 freely passes with clearance. Alternative blades may be unitarily formed with the roots 218 (e.g., as a single piece with continuous microstructure) or non-unitarily integrally formed (e.g., via welding so as to only be destructively removable).

Outboard spacers 226a, 226b connect adjacent pairs of the disks 212a, 212b, 212c. In the gas turbine engine 200, the spacers 226a, 226b are formed separately from the adjacent disks 212a, 212b, 212c. The spacers 226a, 226b may each have end portions in contacting engagement with adjacent portions (e.g., roots 218) of the adjacent disks 212a, 212b, 212c. Alternative spacers may be integrally formed with (e.g., unitarily formed with or welded to) one of the adjacent disks 212a, 212b, 212c and extend to a contacting engagement with the other disk adjacent disk 212a, 212b, 212c.

Inter-disk couplings 228a, 228b are provided between the disks 212a, 212b, 212c. FIG. 2A shows couplings 228a, 228b radially inboard with respect to associated spacers 226a, 226b. The couplings 228a, 228b separate an associated annular inter-disk cavity 230 from an inter-disk cavity 232 between the adjacent bores 224a, 224b, 224c. Each coupling 228a, 228b includes a tubular ring-like first structure 234 (FIGS. 2A-2B) extending aft from the disk thereahead and a second structure 236 extending forward from the disk aft thereof. Each first structure 234 and each second structure 236 are each unitarily-formed with their associated individual disks, extending respectively aft and forward from near the junction of the respective disk webs 222a, 222b, 222c and bores 224a, 224b, 224c. The structures 234, 236 may include or be toothed components that are engageable to form the couplings 228a, 228b.

At respective aft and fore rims of each first structure 234 and each second structure 236, the structures 234, 236 include interfitting radial splines or teeth 238 in a circumferential array (FIG. 2B). That is, in accordance with various embodiments, the structures can be toothed components for a gas turbine engine. The teeth 238 have longitudinal spans roughly the same as a radial span and a circumferential span somewhat longer. The teeth 238 have distally-tapering side walls 240 extending to ends, apexes, or top lands 242. As shown, the side walls 240 of each tooth 238 contacts the adjacent side walls 240 of the adjacent teeth 238 of the other structure 234, 236. Further, as shown, there is a gap 244 between each top land 242 and a base or bottom land 246 of the inter-tooth trough of the opposite structure 234, 236. The gap 244 enables longitudinal compressive force to reinforce circumferential engagement and maintain the two structures 234, 236 tightly engaged. The engagement between the two structures 234, 236 forms the couplings 228a, 228b. Snap couplings, curvic couplings, or other spline structures could be used to form the couplings 228a, 228b without departing from the scope of the present disclosure.

Figure 3:
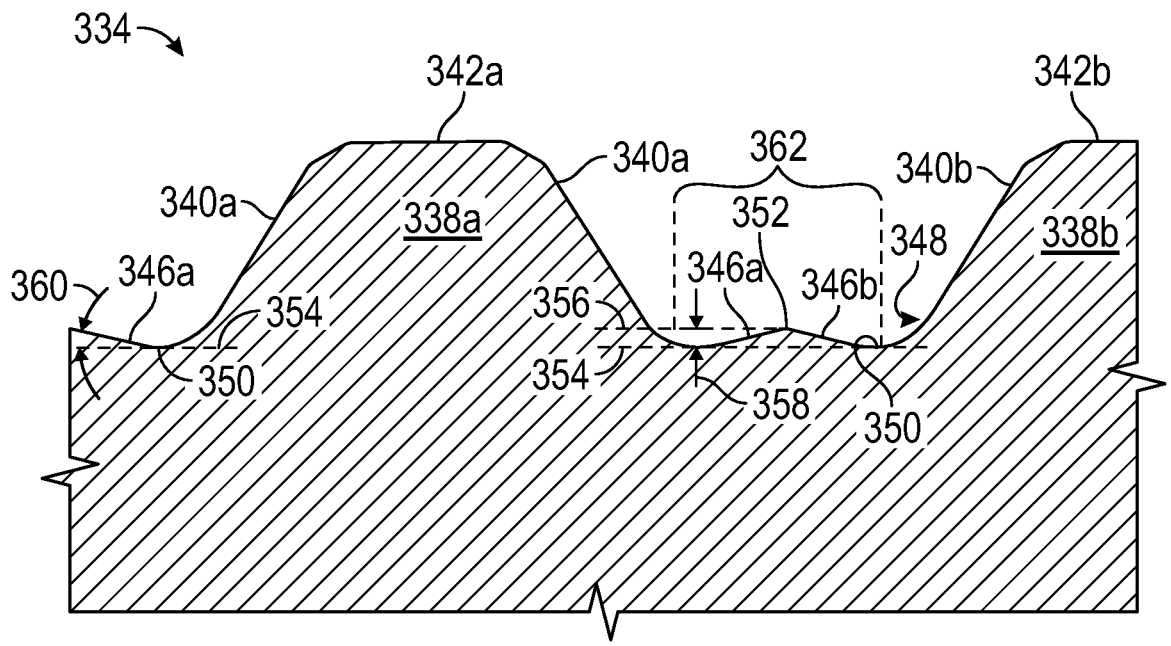
FIG. 3 is a schematic illustration illustrating the features of a gable area formed between teeth of a toothed component.

Turning now to FIG. 3, a side view illustration of teeth 338a, 338b of a structure 334 of a coupling is schematically shown. Each tooth 338a, 338b is defined by respective top lands 342a, 342b, two side walls 340a, 340b, and bottom lands 346a, 346b at the bottom of each side wall 340a, 340b. The transition from the side walls 340a, 340b to the bottom lands 346a, 346b is defined by a fillet radius 348. Each bottom land 346a, 346b includes a minimum 350 and a maximum 352. A minimum line 354 can be drawn from two adjacent minimums 350, with the maximum 352 located between the two adjacent minimums 350, thus defining a gable. A maximum line 356 is a line that is parallel to the minimum line 354 and drawn at the maximum 352, as shown in FIG. 3.

As known in the art, the incline from the minimum 350 to the maximum 352 of the bottom lands 346a, 346b is referred to as a gable. A gable height 358 is defined by a vertical distance between the minimum 350 and the maximum 352, i.e., a distance between the minimum line 354 and the maximum line 356. The angle of incline of the bottom lands 346a, 346b (e.g., from the minimum 350 to the maximum 352) is defined by a gable angle 360. The features of the bottom land 346a, 346b may be referred to herein as a gable area 362.

The gable is formed during a manufacturing process of the structures (e.g., structures 234, 236) when forming the teeth. The gable is allowed to enable manufacturing mismatch. Although the gable enables manufacturing mismatch, the stress between teeth may be high, and thus reducing the stresses between teeth can provide increased component life.

As provided herein, various embodiments enable curvic structures (e.g., toothed components) to have reduced stress due to hoop stress.

In accordance with the present disclosure, an additional grind or processing step is used during the manufacturing of the toothed curvics such that material is removed from the gable area (e.g., gable area 362 of FIG. 3). Such material removal enables optimization of a hoop stress concentration factor (KT) of the curvic tooth (e.g., teeth 338a, 338b of FIG. 3).

Figure 4:
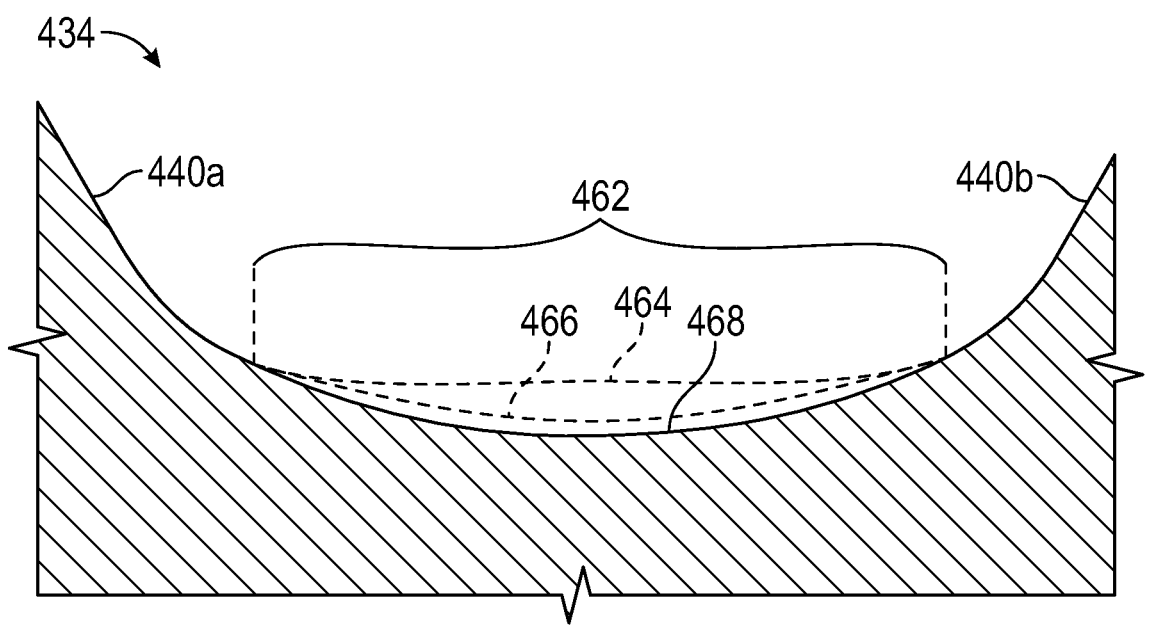
FIG. 4 is a schematic illustration of a comparison of different gable area configurations.

Turning now to FIG. 4, a structure 434 is shown with different bottom land configurations. Located between a first side wall 440a and a second side wall 440b is a gable area 462. In FIG. 4, three different configurations of the gable area 462 are shown. A first configuration 464 is shown illustrating an inclined gable similar to that shown in FIG. 3. A second configuration having a first stress relief feature 466, in accordance with an embodiment of the present disclosure, is shown with the inclined portions of the gable area 462 removed (e.g., material is removed from the gable area 462). The first stress relief feature 466 represents a removal of material from a traditional gable shape (e.g., as shown in FIG. 3). The stress relief features, as provided herein, represent a change from a prior bulge formed by the gable to a depression formed in material (although it may be flat).

A third configuration is shown defining a second stress relief feature 468, in accordance with another embodiment of the present disclosure, with additional material removed from the gable area 462 (as compared to the first stress relief feature 466). Although two variations are shown in FIG. 4, those of skill in the art will appreciate that any amount of material may be removed from the gable area 462 to achieve an improved stress profile at the gable area 462. For example, in some non-limiting embodiments, the removal of material in the gable area 462 can range from achieving a "flat" minimum (e.g., the bottom land defines a surface that is level with a minimum line (e.g., line 354 in FIG. 3) or is a planar surface) to a full radius defined as a continuous fillet radius extending from the first side wall 440a to the second side wall 440b. That is, in some embodiments, the stress relief feature can be defined by a plane or flat surface extending from one side wall to another and in other embodiments a curvature from one side wall may be continuous to another side wall. Still in other embodiments, any curvature ranging between a flat stress relief feature to a full radius stress relief feature are enabled herein.

Figure 5A:
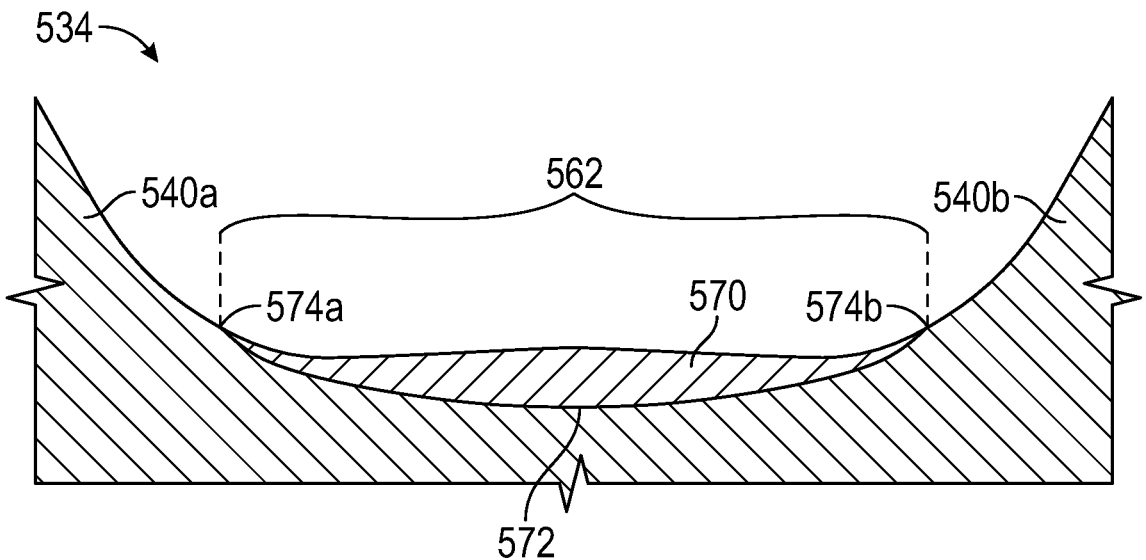
FIG. 5A is a schematic illustration illustrating the change in structure of a toothed component to achieve an embodiment of the present disclosure.
Figure 5B:
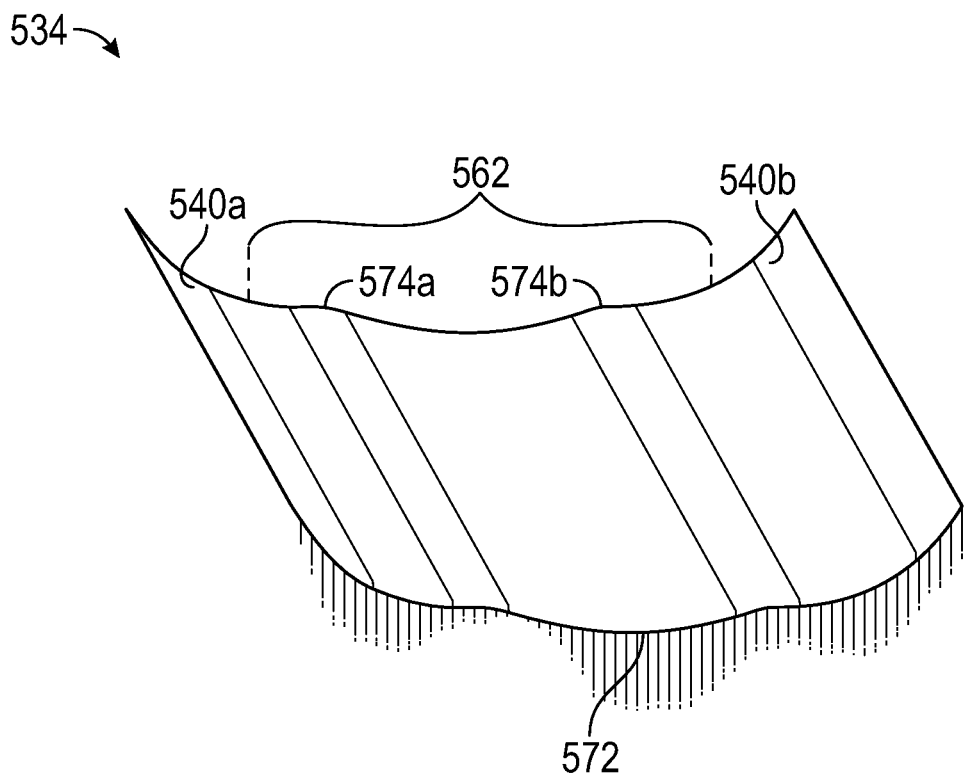
FIG. 5B is an isometric illustration of a stress relief feature in accordance with the present disclosure.

Turning now to FIGS. 5A-5B, illustrations of a gable area 562 of a structure 534 are shown. FIG. 5A illustrates a side view of the gable area 562 indicating the gable material that is removed to form a configuration of an undercut or stress relief feature in accordance with the present disclosure. FIG. 5B illustrates an isometric illustration of the shape of the gable area 562 after the gable material is removed.

As shown in FIG. 5A, a structure 534 includes a first side wall 540a and a second side wall 540b. A gable area 562 is defined between the first side wall 540a and the second side wall 540b. As shown schematically, a gable material 570 represents an amount of material of the structure 534 that is removed to form a stress relief feature 572 in accordance with the present disclosure. As shown, the removed gable material 570 is not a full radius, and thus a first inflection feature 574a is formed between the stress relief feature 572 and the first side wall 540a and a second inflection feature 574b is formed between the stress relief feature 572 and the second side wall 540b. The inflection features 574a, 574b are shown in the isometric illustration of FIG. 5B.

Figure 6A:
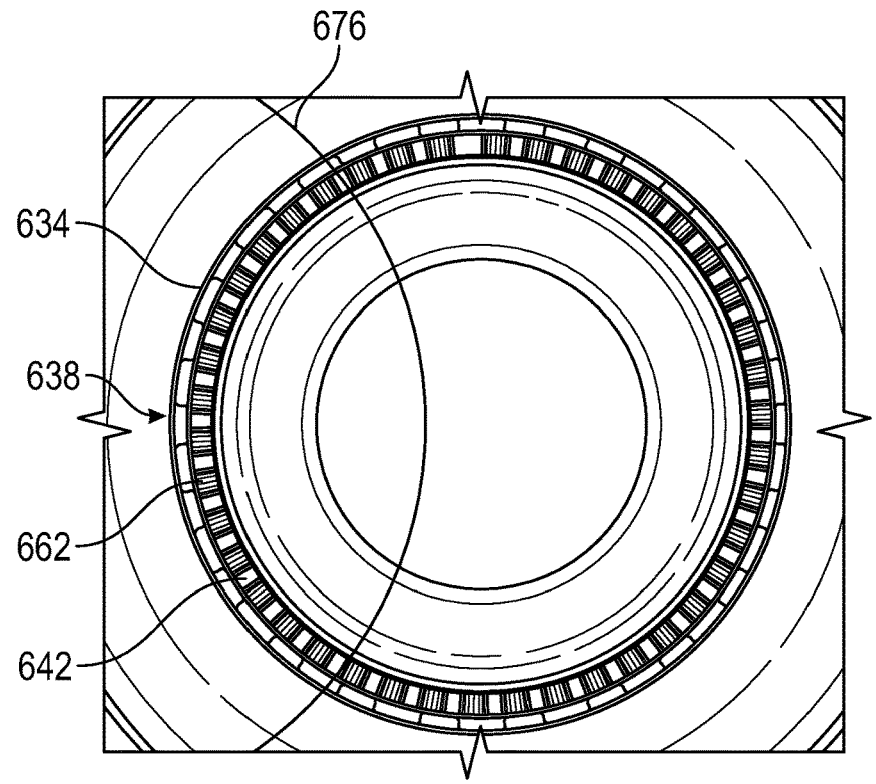
FIG. 6A is schematic illustration of a cutting tool operating on a toothed component in accordance with the present disclosure.
Figure 6B:
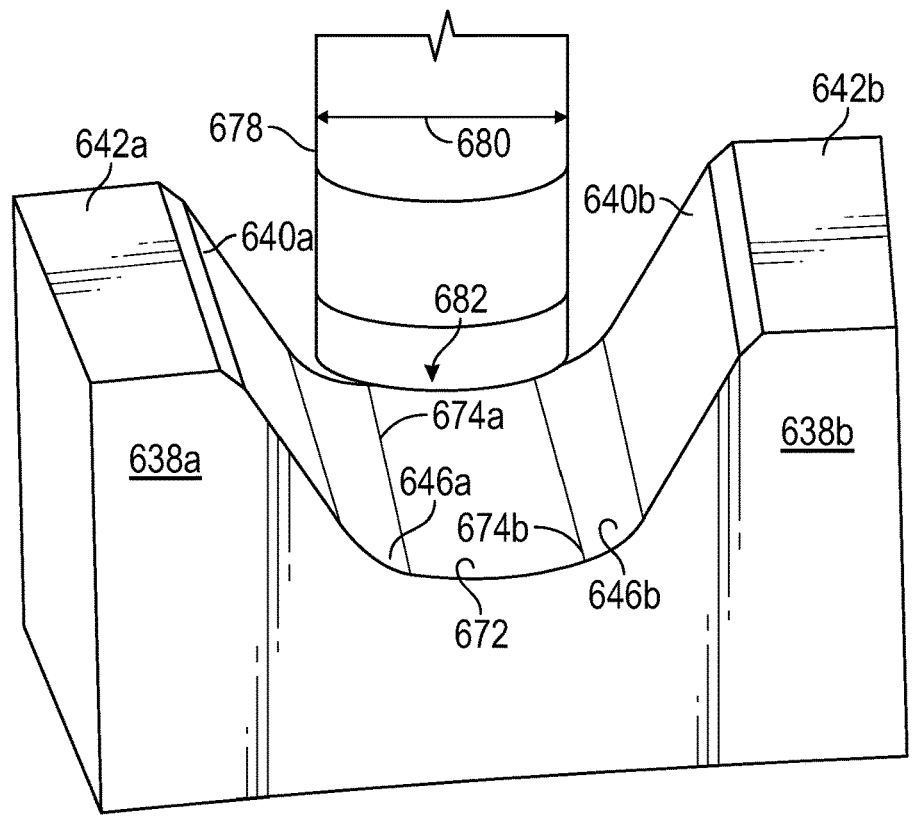
FIG. 6B is a schematic illustration of a cutting tool forming a stress relief feature in accordance with the present disclosure.

Turning now to FIGS. 6A-6B, illustrations of a mechanism for forming the stress relief feature of the gable area of a structures, such as a curvic for a gas turbine engine, are shown. FIG. 6A shows a configuration for a first pass or cutting of a structure 634 to form half of a gable area 662 between adjacent teeth 638. FIG. 6B shows the formation of a stress relief feature 672 in accordance with a non-limiting embodiment of the present disclosure.

Referring to FIG. 6A, a first cutting tool 676 is used to cut first and second sides of teeth 638 to form gable areas 662 between top lands 642 of teeth of the structure 634. In some embodiments, the first cutting tool 676 can be used to form two faces in a single pass or cut. For example, as shown, the first cutting tool 676 can cut two faces of teeth, simultaneously, with the two teeth located at different locations about the structure 634. Those of skill in the art will appreciate that different tool configurations are possible without departing from the scope of the present disclosure. In one non-limiting example, a single pass of the first cutting tool 676 can form bottom lands for two different teeth that are defined by a fillet radius (e.g., as shown in FIG. 3). A second pass of the first cutting tool 676 can be performed to form the adjacent bottom lands and fillet radius for a single gable area (e.g., to form the structure and configuration shown in FIG. 3).

After the first cutting tool 676 is used, the maximum or peak within the gable area between adjacent teeth is present. Accordingly, as shown in FIG. 6B, a second cutting tool 678 is used to remove material from the gable area between adjacent teeth. A first tooth 638a is formed by a first pass of the first cutting tool 676 such that the first tooth 638a has a top land 642a, a side wall 640a, and a bottom land 646a. A second tooth 638b is formed by a second pass of the first cutting tool 676 such that the second tooth 638b has a top land 642b, a side wall 640b, and a bottom land 646b. The second cutting tool 678 is used to make a pass to cut or remove material within the gable area between the first tooth 638a and the second tooth 638b.

The second cutting tool 678 is configured with a tool width 680 and a tool radius 682. The tool width 680 and the tool radius 682 can be selected such that a preselected geometry of a stress relief feature 672 is formed after the cutting operation of the second cutting tool 678. Further, as shown, the cutting operation of the second cutting tool 678 can form first inflection feature 674a and second inflection feature 674b around the stress relief feature 672, as shown. In some non-limiting embodiments, the first cutting tool 676 and the second cutting tool 678 are the same tool configured to make passes to cut the structure multiple times, in different locations relative to the teeth. In other embodiments, the first cutting tool 676 and the second cutting tool 678 are different tools and, further, in some embodiments, the tools may have different geometric configurations, shapes, sizes, etc. In some non-limiting embodiments, for example, a single cutting tool can be used to form all of the features of the teeth and/or gable area in a single pass.

Figure 7:
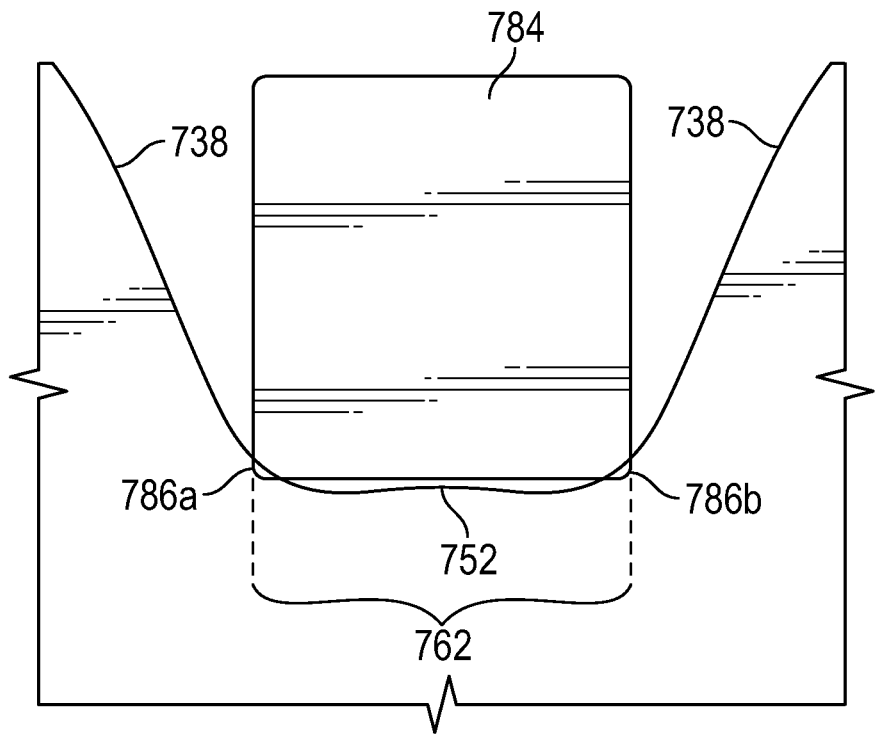
FIG. 7 is a schematic illustration of a cutting tool forming an alternative configuration of a stress relief feature in accordance with the present disclosure.

Turning now to FIG. 7, an alternative configuration in accordance with a non-limiting embodiment of the present disclosure is shown. In FIG. 7, two adjacent teeth 738 are formed with a gable area 762 formed therebetween. In this embodiment, the maximum 752 is not removed from the gable area 762. In contrast, after the gable area is formed (e.g., similar to that shown in FIG. 6A), a second cutting tool 784 is used to cut or form a first stress relief feature 786a and a second stress relief feature 786b. Such a configuration will form multiple inflection features within the gable area 762. Two inflection features will be formed on either side of each stress relief feature 786a, 786b. Thus, including the maximum 752, the configuration shown in FIG. 7 includes five separate inflection features. The stress relief features 786a, 786b of FIG. 7 may be referred to as stress relief notches that are cut from the sides of the gable area 762.

Figure 8:
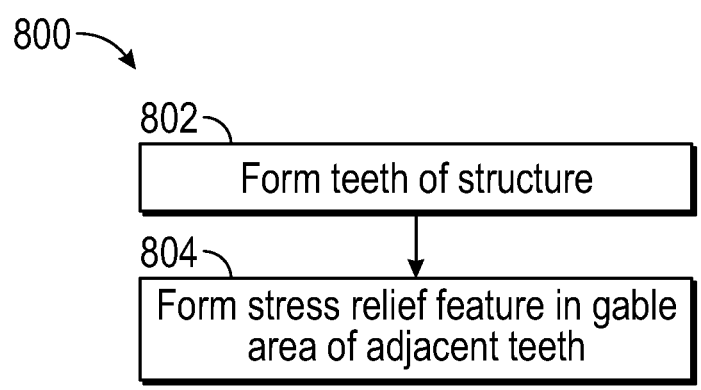
FIG. 8 is a flow process for forming a toothed component having stress relief features in accordance with the present disclosure.

Turning now to FIG. 8, a flow process to form a structure for a gas turbine engine having stress relief features in accordance with the present disclosure is shown. The flow process 800 can be used to form a curvic structure or other toothed structure used in gas turbine engines or other devices, and may be used to form structures and/or configurations as shown and described above. Those of skill in the art will appreciate that the flow process 800 can be performed with one or more cutting tools and further can be used to form tooth structures and/or geometries that are different from those shown and described herein.

At block 802 teeth of structure are formed. The teeth can be formed by one or more tools, such as cutting and/or grinding tools. As shown and described above, the teeth can be teeth of a curvic for a gas turbine engine. The formation of the teeth can result in a gable area forming between two adjacent teeth (e.g., in the tooth bottom land area). The gable area can include a maximum that is reached at a midpoint between the two adjacent teeth (e.g., as shown in FIG. 3).

At block 804, one or more stress relief features are formed in the gable area between adjacent teeth. The one or more stress relief features are formed by the removal of structure material in the gable area, as described above. The stress relief features can be achieved by one or more passes of a tool, such as cutting and/or grinding tools.

In some embodiments, the process 800 can be performed using a single tool that is used to form both the teeth and the stress relief features. In other embodiments, different tools having different sizes, geometries, cutting/grinding surfaces, etc. can be used. Further, those of skill in the art will appreciate that in some embodiments, the forming of the teeth and the stress relief features can be performed in a single operation or may be performed as separate operations.

Advantageously, embodiments described herein provide improved part life by reducing stress concentrations. For example, in some embodiments, a primary stress driver (hoop stress) concentration factor can be reduced by forming a stress relief feature in a gable area of toothed components (e.g., a curvic or other structure in a gas turbine engine). In some non-limiting embodiments, stress reductions can be 5% –35% or greater hoop stress KT reduction. Advantageously, the stress reductions can provide significant part life. For example, some non-limiting embodiments can double the life of a toothed component.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, although an aero or aircraft engine application is shown and described above, those of skill in the art will appreciate that turbine disk configurations as described herein may be applied to industrial applications and/or industrial gas turbine engines, land based or otherwise.

Accordingly, the present disclosure is not to be seen as limited by the foregoing description, but is only limited by the scope of the appended claims.

What is claimed is:

1. A toothed component for a gas turbine engine, the toothed component comprising:
   a structure configured to engage with another component of the gas turbine engine;
   a first tooth on the structure, the first tooth having a top land, a bottom land, a side wall extending from the top land to the bottom land, at least a portion of the side wall being concave, a fillet radius transitioning between the side wall and the bottom land, and the bottom land has a minimum adjacent the fillet radius and a maximum away from the fillet radius;
   a second tooth on the structure adjacent the first tooth, the second tooth having a top land, a bottom land, a side wall extending from the top land to the bottom land and facing the first tooth, at least a portion of the side wall being concave, and a fillet radius transitioning between the side wall and the bottom land, the bottom land of the second tooth extending from a respective minimum adjacent the respective fillet radius toward the maximum of the bottom land of the first tooth,
   wherein the maximum of the bottom land of the first tooth and a maximum of the bottom land of the second tooth define a gable area of the component that peaks where the maximum of the bottom land of the first tooth and the maximum of the bottom land of the second tooth join, wherein the gable area of the component has a primary stress driver concentration factor;
   at least one concave stress relief feature having a radius of curvature different than a radius of curvature of the concave portions of the side walls of the first and second teeth, comprising a region of removed material that is formed in the gable area and defines a reduced stress concentration of the primary stress driver concentration factor in the gable area during operation of the toothed component, as compared to the primary stress driver concentration factor in a gable area of a toothed component without such stress relief feature;
   a first inflection feature between the stress relief feature and the side wall of the first tooth, and
   a second inflection feature between the stress relief feature and the side wall of the second tooth.

2. The toothed component of claim 1, wherein the toothed component is a curvic of a gas turbine engine.

3. The toothed component of claim 2, wherein the curvic comprises a plurality of teeth with a plurality of stress relief features located between adjacent teeth of the plurality of teeth.

4. A gas turbine engine comprising:
   a structure defining a curvic of the gas turbine engine, the curvic having:
   a first tooth on the structure, the first tooth having a top land, a bottom land, a side wall extending from the top land to the bottom land, land, at least a portion of the side wall being concave, a fillet radius transitioning between the side wall and the bottom land, and the bottom land has a minimum adjacent the fillet radius and a maximum away from the fillet radius;
   a second tooth on the structure adjacent the first tooth, the second tooth having a top land, a bottom land, a side wall extending from the top land to the bottom land and facing the first tooth, land, at least a portion of the side wall being concave, and a fillet radius transitioning between the side wall and the bottom land, the bottom land of the second tooth extending from a respective minimum adjacent the respective fillet radius toward the maximum of the bottom land of the first tooth,
   wherein the maximum of the bottom land of the first tooth and a maximum of the bottom land of the second tooth define a gable area of the component that peaks where the maximum of the bottom land of the first tooth and the maximum of the bottom land of the second tooth join, wherein the gable area of the component has a primary stress driver concentration factor;
   at least one concave stress relief feature having a radius of curvature different than a radius of curvature of the concave portions of the side walls of the first and second teeth, comprising a region of removed material that is formed in the gable area and defines a reduced stress concentration of the primary stress driver concentration factor in the gable area during operation of the toothed component, as compared to the primary stress driver concentration factor in a gable area of a toothed component without such stress relief feature;
   a first inflection feature between the stress relief feature and the side wall of the first tooth; and
   a second inflection feature between the stress relief feature and the side wall of the second tooth.

5. The gas turbine engine of claim 4, further comprising a second structure, the second structure configured to engage with the curvic, the second structure having a second structure stress relief feature.

6. A method of manufacturing a toothed component for a gas turbine engine, the method comprising:
   forming a first tooth in the component, the first tooth having a top land, a bottom land, a side wall extending from the top land to the bottom land, at least a portion of the side wall being concave, a fillet radius transitioning between the side wall and the bottom land, and the bottom land has a minimum adjacent the fillet radius and a maximum away from the fillet radius;
   forming a second tooth in the component adjacent the first tooth, the second tooth having a top land, a bottom land, a side wall extending from the top land to the bottom land and facing the first tooth, at least a portion of the side wall being concave, and a fillet radius transitioning between the side wall and the bottom land, the bottom land of the second tooth extending from a respective minimum adjacent the respective fillet radius toward the maximum of the bottom land of the first tooth,
   wherein the maximum of the bottom land of the first tooth and a maximum of the bottom land of the second tooth define a gable area of the component that peaks where the maximum of the bottom land of the first tooth and the maximum of the bottom land of the second tooth join, wherein the gable area of the component has a primary stress driver concentration factor; and
   forming a concave stress relief feature having a radius of curvature different than a radius of curvature of the concave portions of the side walls of the first and second teeth, after formation of the first tooth and the second tooth, by removing material at the joined maximums in the gable area such that the stress relief feature reduces the primary stress driver concentration factor in the gable area during operation of the toothed component, as compared to the primary stress driver concentration factor in a gable area of a toothed component without such stress relief feature,
   wherein forming the stress relief feature forms a first inflection feature between the stress relief feature and the side wall of the first tooth and a second inflection feature between the stress relief feature and the side wall of the second tooth.

7. The method of claim 6, wherein the toothed component is a curvic of a gas turbine engine.

8. The method of claim 7, wherein the curvic comprises a plurality of teeth with a plurality of stress relief features located between adjacent teeth of the plurality of teeth.

\* \* \* \* \*